March 17, 1953  S. KRASNOW ET AL  2,631,671
BOREHOLE METHOD AND APPARATUS
Filed May 6, 1941  3 Sheets-Sheet 1
FIG.8.
FIG.1.
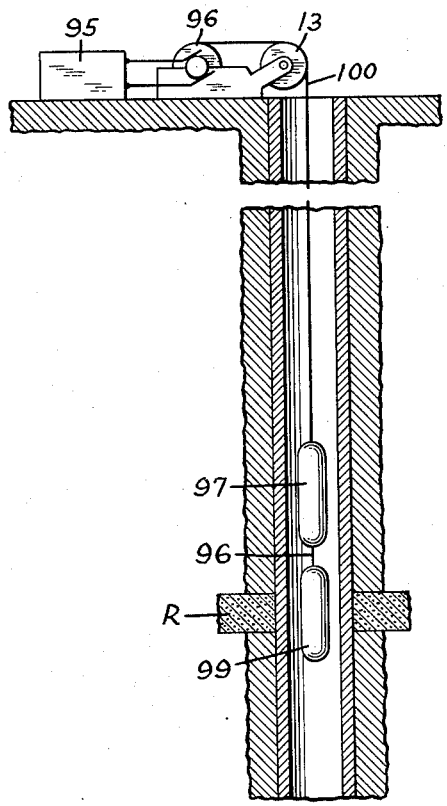
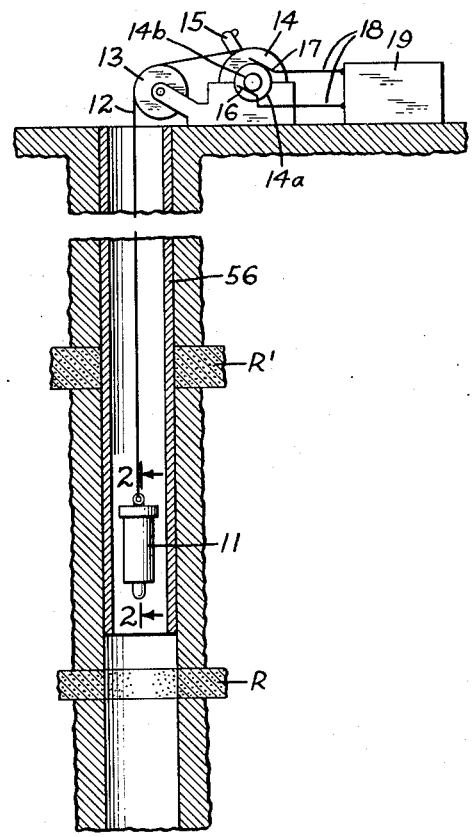
FIG.3.
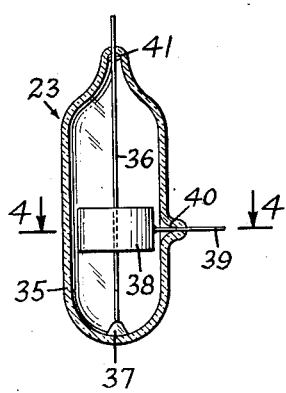
FIG.4.
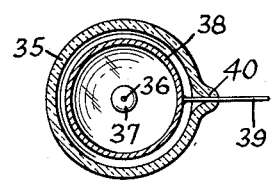
INVENTORS.
SHELLEY KRASNOW
LEON F. CURTISS
BY
Campbell, Brumbaugh, Free Graves
THEIR ATTORNEYS.

March 17, 1953 S. KRASNOW ET AL 2,631,671
BOREHOLE METHOD AND APPARATUS
Filed May 6, 1941 3 Sheets-Sheet 2

INVENTORS.
SHELLEY KRASNOW
LEON F. CURTISS
BY
Campbell, Brumbaugh, Free & Graves
THEIR ATTORNEYS.

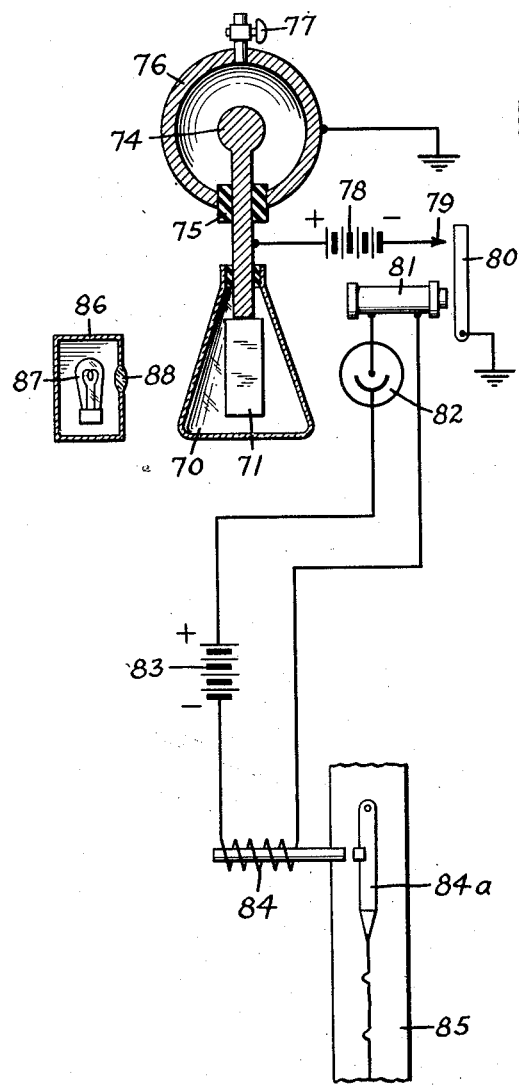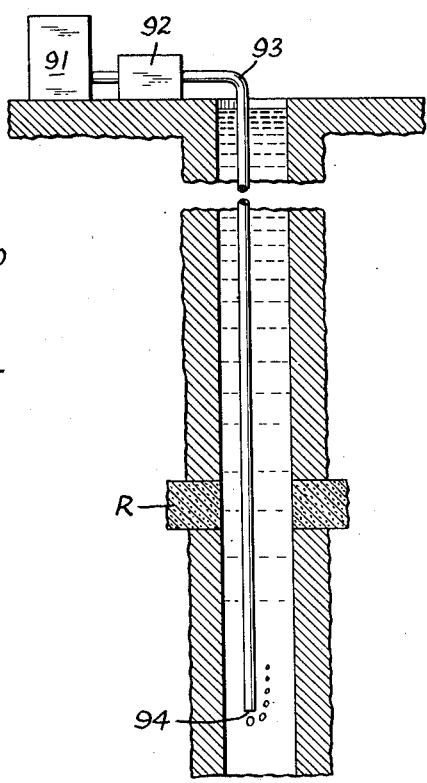

Patented Mar. 17, 1953

2,631,671

UNITED STATES PATENT OFFICE 2,631,671

BOREHOLE METHOD AND APPARATUS

Shelley Krasnow, New York, N. Y., and Leon F. Curtiss, Garrett Park, Md., assignors to Schlumberger Well Surveying Corporation, Houston, Tex., a corporation of Delaware Application May 6, 1941, Serial No. 392,188

27 Claims. (Cl. 166—1)

This invention relates to carrying out mechanical operations in boreholes in the earth and related operations in other inaccessible locations and more particularly relates to methods and apparatus enabling mechanical operations to be carried out in boreholes or other inaccessible locations.

Exemplifying the invention of the present case, reference may be made to the prior art techniques employed in the location and determination of the depth of hydrocarbon deposits in the earth. Heretofore it has been impossible to determine the depth of the hydrocarbon deposit after the casing has been set. It has been necessary to determine the depth of the deposit, set the casing, and then perform the mechanical operation such as that of perforation at the depth corresponding to that previously determined by measurement. The intrinsic errors in such procedure involved inaccuracies particularly in measurement since heretofore it has been the custom to measure the depth to the level in question and then run the perforator, for example, to that depth. This involved two measurements, the combined error of which was at times sufficient to cause perforation to be performed at the wrong level.

Among the objects of the present invention is included the carrying out of mechanical operations more rapidly and in more accurate manner.

Further objects include determination of the depth of deposit or point at which a mechanical operation is to be carried out and the carrying out of such mechanical operation such as perforation in a single run.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

Figure 2:
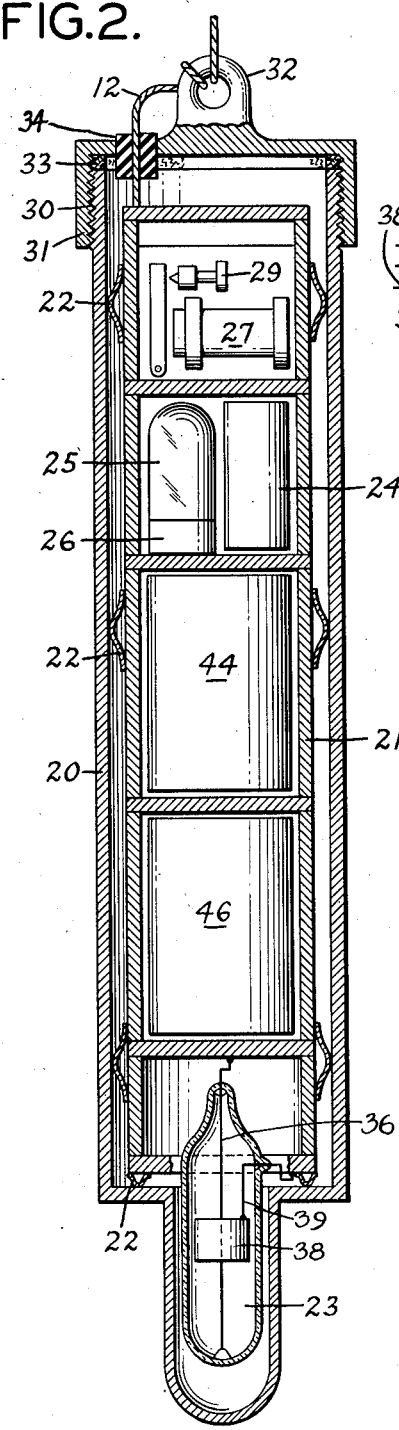
Figure 5:
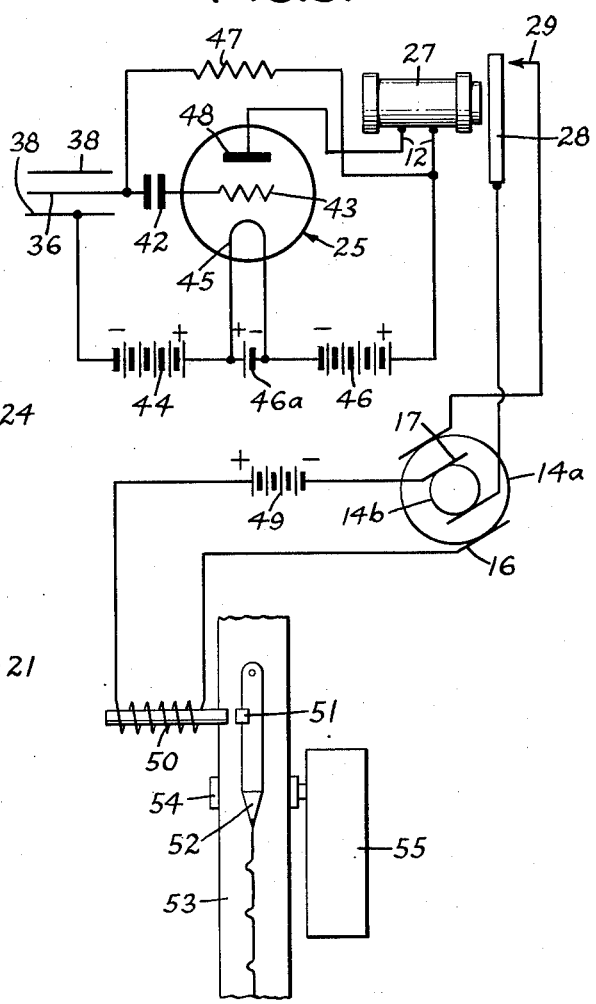

In accordance with that more detailed description, there is shown in the accompanying drawings, in Figure 1, a convenient form of apparatus for measuring radioactivity at various depths in a borehole; in Figure 2, an enlarged cross sectional view of the element 11 shown in Figure 1, taken on the line 2—2; in Figure 3, a sensitive element that may be employed in the apparatus shown in Figure 2; in Figure 4, a cross section of the element of Figure 3 taken on the line 4—4; in Figure 5, a diagram of a circuit employed in the apparatus shown in Figure 1; in Figure 6, a diagram of a modified form of apparatus for obtaining indications of radioactivity in a well; in Figure 7, a means of rendering strata artificially radioactive, and in Figure 8, a modification of the apparatus designed to permit perforation of the casing in a well.

This application is a division of application Serial No. 301,078, filed October 24, 1939, now Patent No. 2,590,873, issued April 1, 1952, entitled Method and Apparatus for Measuring Radioactivity.

In accordance with the present invention, operations are carried out in inaccessible localities including measurement of physical quantities and performance of mechanical operations. Since it represents one of the most desirable applications of the invention, operations in a borehole will be used to exemplify the present invention without intending any restriction thereto.

In operating in a borehole, as for example, in geophysical prospecting, it is frequently necessary to locate a point, locality or depth at which a mechanical operation is to be carried out. This requires determination of said point, locality or depth with reasonable certainty. As an example of such mechanical operation, perforation of the casing of a borehole is frequently required in order to facilitate free movement of material from a deposit within the earth to the surface thereof.

While other methods of determining the point, locality or depth at which any such mechanical operation can be carried out, can be employed, the use of measurement of radioactivity is peculiarly adapted for such purposes enabling conjoint or simultaneous determination of physical properties and mechanical operations to be effected. The use of radioactivity measurement will be utilized below to illustrate the present invention because of its peculiar adaptivity to the problems in hand and its ready solution and effective utilization.

Utilization of the present invention enables methods to be carried out for the determination of the depths of the deposit and the performing of the perforation, for example, in a single run, together with apparatus for carrying out such operations. This allows the operation to be performed more rapidly and in more accurate fashion. The novel feature of measuring important physical quantities within the borehole while the perforating unit is being lowered to position where it is to be operated, may also be noted.

There are distinct advantages in being able to make a measurement and also perform a mechanical operation with the consuming of no more time than would be required for the mechanical operation itself. For these purposes, methods and apparatus may be employed wherein means are controlled from the surface of the earth to cause perforation to be accomplished and additional means are mounted in close proximity to the said perforating means such additional means serving to measure a physical quantity. For example, in apparatus for perforating the metallic casing lining a borehole, there may be a perforating unit, a suspending cable carrying the same, means sensitive to the radioactivity of the deposits being sought, and a conducting member to conduct the responses from such sensitive means to the surface of the earth, the cable being employed for conducting responses from the sensitive means to the surface and also serving for operation of the perforating device. In this way a deposit at any point may be located by its associated radioactive properties, for example, and perforation caused at a depth at which a significant change of radioactive intensity, for example, has been noted. There is thus provided a method and means for measuring the depth at which radioactive properties, etc. are noted, and causing perforation or other mechanical operation to be performed at that depth, the operations being carried out independent of any specific measurement of depth per se. Usually the means sensitive to radioactivity and the perforating means will be lowered simultaneously so that measurement of radioactivity may be carried on continuously as both the radioactive-sensitive and perforating means are lowered so that the apparatus may be halted at the depth at which a significant change in radioactive intensity has been noted and perforation then performed at this point. In such cases the means for measuring physical properties such as radioactivity and the means for performing the mechanical operation such as perforation will be co-extensive or contiguous one to the other, the suspending electrical cable serving to lower and raise the unit for perforation and also the means sensitive to radioactivity, the two units and means being mounted in substantial proximity to one another.

Because of its great importance in connection with the present invention, methods and means for measurement and determination of physical properties at various points within the borehole, will be described below particularly because prior to this invention, there was no concept of and no adequate means for measuring radioactivity or other similar physical properties at inaccessible localities such as in boreholes. There are thus supplied methods and apparatus for measuring radioactivity in inaccessible locations, such as in boreholes or at considerable depths in bodies of water. In this way it is possible to locate deposits of minerals having radioactive properties and to measure radioactive properties continuously from the top to the bottom of a borehole, and to have an immediate indication and if desired a permanent record, of the radioactivity at various depths. Advantage may be taken of the fact that deposits of petroleum are often markedly radioactive as compared with the surrounding rock material, possibly due to the superior absorptive property of petroleum for radium emanation. Natural gas and ground water are also known to be somewhat more radioactive than their surrounding rock material. In drilling for either petroleum or natural gas or ground water, it is desirable to know the exact level at which the strata having these are traversed by the drilled hole. Such features well illustrate the utilization of radioactive methods in accordance with the present invention.

Referring now to Figure 1, apparatus for obtaining indications of radioactivity in a well is shown which comprises a cartridge 11 suspended in the borehole by a conducting cable 12. The cable 12 passes over a measuring wheel 13 and thence onto a reel 14 operated by a crank 15. A pair of slip-rings 14a and 14b fastened to the shaft of the reel 14 have bearing upon them the brushes 16 and 17. These brushes are connected through the medium of wires 18, 18, to a recording element 19. Referring now to Figures 2 and 3, the cartridge 11 consists essentially of a radioactive-sensitive member 23 mounted at the bottom of a pressure-tight cartridge 20. A rack 21 holds the element 23 and serves further to hold batteries 44 and 46, vacuum tube 25, and relay 27. Springs 22 serve to prevent violent contact of the frame 21 with cartridge 20. A cap 31 is fastened by means of a threaded or other connection 30 onto one end of cartridge 20. A fluid tight seal is had by the use of gasket 33. The wires necessary to convey the signals from the cartridge 11 pass through insulating bushing 34 and are looped onto ring 32 and thence pass to the surface. In this way the wire serves also for raising and lowering member 11.

The sensitive element 23 consists essentially of a sealed glass vessel 35 which has within it a conducting ring 38 connected to wire 39 passing through seal 40. Through the axis of ring 38 there passes another conducting member 36, in the form of a wire or filament. This member 36 passes through seal 41 and is further anchored against mechanical movement by being fastened to the bottom of the vessel at 37. Container 35 is filled with any desired gas such as air, at a pressure which may be as little as a few centimeters of mercury or as much as atmospheric, and is then sealed off, after which it may be used for long periods of time without further attention. In operation the members 36 and 38 are kept at a high potential relative to each other by means of batteries 46 and 44 operating through high resistance leak 47, as shown in Figure 5. A suitable value for the voltage of battery 46 is 135 volts; of battery 44, 360 volts. The positive end of battery 44 is connected to one side of the filament 45 of vacuum tube 25. The member 36 is connected to a blocking condenser 42 and thence to the grid 43 of the same vacuum tube. The plate 48 of this tube is connected through relay 27 to the positive end of battery 46. The relay 27, when de-energized, serves to close contacts 28 and 29, thus allowing a current to flow through slip-rings 14a and 14b, brushes 16 and 17, electro-magnet 50 and battery 49. The electro-magnet 50 serves to attract armature 51 which further serves to move pen 52 across the tape 53 kept in constant uniform motion by means of drum 54 operated by driving means 55.

The operation of the apparatus is as follows: The members 36 and 38 are charged at a controlled rate to a high potential relative to each other by means of the batteries 46 and 44 operating through leak 47. In the presence of radio-active material the gas in the container 35 will be partially ionized and will thus change the potential of the member 36. This will result in a change of potential of the grid 43 which will reduce the current normally flowing between filament 45 and plate 48 of vacuum tube 25. This will in turn reduce the current in relay 27 sufficiently to allow its armature 28 to be retracted, closing the circuit between member 28 and contact 29. The closing of this circuit will cause a current to flow through slip-ring 14b, brush 17, battery 49, electro-magnet 50, brush 16, and slip-ring 14a. The energizing of electro-magnet 50 will cause armature 51 to move pen 52, causing a break in the line traced on tape 53.

Upon the operation of the circuit in this fashion, the potential of member 36 will be restored to its original value, increasing the filament-to-plate current in tube 25, energizing relay 27 and thereby causing the circuit made by members 28 and 29 to open.

Upon the further ionization of the gas in container 35 the operation above described will be repeated. Thus the frequency of the pulses finally received by pen 52 will be a measure of the radioactivity of the material in the vicinity of member 23. It will be noted that the rays given off by radioactive substances have considerable penetrating power and can, therefore, easily penetrate the shield 20 even if the latter be made of metal. To reduce the absorption of these rays by the metal, however, that portion of the cartridge 20 which houses the member 23 is provided with thinner walls than the remainder; a construction made possible by the smaller diameter of the said portion. It will be noted further that even if a metallic casing such as 56 exists in the borehole the presence of a radioactive layer such as R' may be noted because of the easy penetration of the rays through the thickness of metal ordinarily employed for casing.

A somewhat more elaborate arrangement is shown schematically in Figure 6. In this, means are provided to charge an electroscope periodically on its charge falling off by a definite amount. The frequency with which the electroscope is charged is a measure of the ionization current flowing and thus of the intensity of radiation in the vicinity. Specifically, the apparatus consists of an ionization chamber having an outer conducting wall 76 into which is fastened a stopcock 77 through which a suitable gas, such as air, may be passed into the chamber. An electrode 74 passes through an insulator 75 and thence into the electroscope 70. A lamp 87, surrounded by a light tight housing 86, and having a focusing lens 88, casts a beam of light on photocell 82 which beam is interrupted by the leaf 71 when the electroscope 70 is fully charged. As the electroscope is discharged by radioactivity impinging on the ionization chamber, the leaf 71 moves out of the path of the beam so that the latter falls on the photocell 82. In such event a current passes through cell 82, relay 81, electro-magnet 84, and energizing battery 83. The operation of the relay 81 closes contacts 79 and 80, thus causing battery 78 to recharge the electrode 74, and thus leaf 71. Whenever this event occurs, pen 84a is caused to move across chronograph tape 85, and thus produce a kink in the line traced by the pen. The frequency of these kinks is, therefore, a measure of the radioactivity in the vicinity of chamber 76.

In the types of apparatus shown in Figure 2 and Figure 6, the chronograph and entire recording system may be clock operated and mounted in the cartridge so that no conducting wires need pass to the surface. As a further alternative, the motion of the tape may be made not a function of time, but rather of the position of a measuring wheel such as 13. In the apparatus shown in Figure 6, the elements shown as 83, 84, 84a and 85, may be mounted at the surface of the ground, similar to the mounting of element 19 in Figure 1; the rest of the apparatus being mounted in a cartridge suitable for lowering to the desired location. Thus, all of the elements shown in Figure 6, with the exception of members 83, 84, 84a, and 85, would be enclosed within a cartridge and lowered into the borehole. These last named elements would be at the surface of the ground as with similar members shown in Figure 1.

The apparatus shown in Figure 2 particularly, may be made extremely sensitive to the rays emitted by radioactive substances and so the sometimes faint radioactivity of petroleum, natural gas and ground water detected. As has been pointed out previously, this may be done in spite of any covering of mud or of metallic casing intervening between the walls of the borehole and the cartridge 11. It is in fact, possible to run the cartridge 11 inside of the standard drill pipe used in rotary drilling and thus make measurements with a minimum of disturbance to drilling. Because of the limited absorptive power of the metals customarily used for drilling, it will still be possible to detect radioactive rays through the thickness of metal in the drill pipe, or even through the several inch thickness of the drilling tools.

It is obvious that any other means than those shown or described may be used to convey the frequency of the impulses produced by the apparatus in Figure 2 or in Figure 6, to the surface.

While, from what has been disclosed above, it is evident that strata may be differentiated from each other by means of the quantitative difference in the amount of associated radioactive material, it will be appreciated that strata need not necessarily be widely different in their associated radioactivity to enable one to differentiate them from one another. In cases where the associated radioactivities are not conspicuously different in conducting measurements from one end of the borehole to the other, valuable information may still be obtained by considering the manner in which the radioactivity varies, or phrased differently, the function by which radioactive intensity changes as the depth is altered. This will be found particularly valuable in searching for oil deposits. It will be recalled that petroleum deposits in the natural state have water associated with them. In many cases the water underlies the petroleum, and will have a radioactivity markedly different from that of the petroleum itself. Thus if an apparatus, as described above, were lowered past a formation, a sudden change would be observed in passing from rock to petroleum, another sudden change in passing from petroleum to water, and still another sudden change in passing from water to rock. The layers might thus be easily identifiable despite the fact that their radioactivity may be no greater or less than that of most of the rock lining the borehole.

In certain localities, petroleum in particular may be found to have a limited radioactivity; so limited that detecting its presence with the apparatus shown becomes difficult. In these cases advantage may be taken of the superior absorptive power of petroleum for radium emanation gas. Radium emanation gas may be introduced at the surface of the borehole, being pumped into it so as to reach the lowest level. The borehole may then be cleaned out with a suitable fluid, such as water, and a test made for radioactivity in the manner described previously. It will be seen that if any petroleum exists in the borehole, it will absorb radium emanation gas in greater proportion than the other strata, and will, therefore, exhibit a stronger radioactivity.

Figure 7 shows an arrangement for performing the above operation. Here a gas container is shown schematically as 91. This contains the radium emanation gas (sometimes known as "radon"). A pump shown schematically as 92 serves to draw the gas from the tank 91 and pump it down through conduit 93. The gas emerges at the opening 94 of the conduit 93. A layer having superior absorptive properties for radon gas, such as an oil bearing layer, will absorb the gas more rapidly than the other layers. Such an absorbing layer is shown as R. In this instance the borehole is shown as being full of fluid through which the gas is bubbled.

While radon gas has been mentioned as a suitable material, it will be appreciated that other substances having radioactive properties may be used instead. Such other substances may be radioactive salts, either those having a natural radioactivity or those having an artificially excited radioactivity. It is only necessary for the purpose of the invention that the substance used be selectively absorbed by the layer of interest within the borehole.

It will further be appreciated that in some cases the lack of absorption of the radioactive materials by a layer will serve to identify the layer. In still other cases, the absorption, due to a layer, may be so great, that the area in the region of the layer will be denuded of radioactive material, and will appear less radioactive than the areas in which the absorption is less. In all cases, however, the differences between layers will be identifiable by the differences in residual radioactivity.

The elements employed in the member 11 may be combined with a perforating tool as ordinarily used for perforating casing in oil, gas or water wells. With this it will be possible to lower the apparatus slowly until an indication of radioactivity is received. The apparatus may then be stopped and the perforating procedure carried on as usual. This will have the advantage of eliminating the inaccuracy usually made in measurement. Heretofore, it has been the custom to measure the depth to the level in question, then run the perforator to that depth. This involved two measurements, the combined error of which was at times sufficient to cause perforation to be performed at the wrong level. The method described above can have none of these errors, since it is not dependent in any way on a measurement of depth.

A schematic showing of this appears in Figure 8. Here an apparatus capable of measuring radioactivity is shown schematically as 97. This is connected to a perforating element 99. This latter arrangement may be of any of the well known types. However, the type known as a "gun perforator," which perforates the casing by firing bullets through the casing, will be found particularly suitable. The assemblage made up of radioactive apparatus 97, connector 98 and perforating element 99 may be raised and lowered by means of cable 100. This cable will serve both for raising and lowering and for operating the apparatus and making observations. The cable passes over wheel 13, onto reel 96. Connection is made between the reel and apparatus 95. Apparatus 95 serves to make observations and to control the elements that are being raised and lowered.

While the apparatus described herein for performing mechanical operations is a perforator, it will be understood that other apparatus for performing mechanical operations may be utilized in place of the perforator, while enjoying all of the advantages of ease of location of radioactive deposits—whether such deposits are natural or artificial. As examples of such other uses may be mentioned the taking of side-wall samples from a borehole. Thus one may obtain a sample of the exact material lining a borehole at a certain depth. A side wall sampling device as known in the art may be lowered together with a radioactive measuring device. When the layer of interest is reached as indicated by a known radioactive intensity or known character of change of radioactive intensity, the apparatus can be halted and a sample taken at that depth. Similarly, in cementing operations, it may be desirable to know the depth to which to lower certain of the cementing apparatus. If such apparatus is lowered together with radioactive measuring equipment, the exact point at which to stop can be readily determined. The same may be applied to such elements as packers, swabs, etc. The advantage of such a system is that no measurement of depth is necessary.

Having thus set forth our invention, we claim:

1. In means for perforating a casing in a well, the combination of: a perforator; means for moving said perforator within said casing; marker locating means connected to said perforator so as to move therewith; and means for actuating said perforator.

2. In means for perforating a casing in a well, the combination of: a perforator; means for moving said perforator within said casing; radioactive marker locating means connected to said perforator so as to move therewith; and means for actuating said perforator.

3. In an apparatus for perforating the metallic casing lining a borehole, an electrically operated perforating unit electrically and mechanically connected to a suspending electrical cable serving to lower and raise the said unit, and means sensitive to radioactivity, the last named means being coupled to the perforating unit so as to move in accordance therewith and further electrically connected to said cable, the electrical cable serving to conduct the responses from the last named means to the surface and also to serve for operation of the perforating device.

4. In an apparatus for use in a borehole lined with a casing, means to perforate said casing, and additional means coupled to the first so as to move in accordance therewith, the second named means being sensitive to the radioactivity within the borehole, and serving to indicate the correct depth at which the perforation is to be performed.

5. In a method of producing a fluid from the earth, the steps of: forming in the earth a bore hole which intersects a production stratum; preparing a log of the formations intersected by said bore hole, said log showing said production stratum; establishing a marker below the surface of the earth and in a known relation to said production stratum; setting a casing in said bore hole so as to intersect said production stratum; locating said marker; and then perforating said casing in a position correlated with said marker and determined in accordance with said known relation of said production stratum and said marker, whereby said perforating will connect the interior of said casing with said production stratum.

6. In a method of producing a fluid from the earth, the steps of: forming in the earth a bore hole which intersects a production stratum; preparing a log of the formations intersected by said bore hole, said log showing said production stratum, said log including an electrometric record of the formations intersected by said bore hole; establishing a stratum as a marker below the surface of the earth and in a known relation to said production stratum; setting a casing in said bore hole so as to intersect said production stratum; locating said marker by electrometric means; and then perforating said casing in a position correlated with said marker and determined in accordance with said known relation of said production stratum and said marker, whereby said perforating will connect the interior of said casing with said production stratum.

7. In a method of producing a fluid from the earth, the steps of: forming in the earth a bore hole which intersects a production stratum; establishing a marker below the surface of the earth and in a known relation to said production stratum; setting a casing in said bore hole so as to intersect said production stratum; locating said marker; and then perforating said casing in a position correlated with said marker and determined in accordance with said known relation of said production stratum and said marker, whereby said perforating will connect the interior of said casing with said production stratum.

8. In means for perforating a casing in a well wherein a geophysical marker has been established in a known relation to a production stratum, the combination of: a perforator; means for moving said perforator within said casing; marker locating means comprising an electrometric stratalogging device having a recording means outside the well and a testing element connected to said perforator so as to move therewith; and means for actuating said perforator.

9. In means for accurately positioning a member in a well in which a marker has been established, the combination of: electrometric means for locating said marker, said electrometric means comprising a sensitive element adapted to be lowered into the well to the position of said marker and means outside said well to indicate to an observer when said sensitive element is positioned adjacent said marker; and means for moving in said well said sensitive element and the member which is to be positioned.

10. The method which comprises establishing a marker in an uncased well, in a known relation to a stratum, putting casing in the well, lowering casing perforating means and means connected thereto for locating the marker through the casing, locating the marker through the casing with said locating means and perforating a hole through the casing into the stratum with said perforating means.

11. The method which comprises establishing a radioactive marker in an uncased well, in a known relation to a stratum, putting casing in the well, lowering perforating means and means connected thereto for locating the marker by its radioactivity through the casing, locating the marker through the casing with said locating means and perforating a hole through the casing into the stratum.

12. In apparatus for perforating a casing in a well in which a marker has been established, in a known relation to a stratum, means for locating the marker through the casing, and means connected to said marker locating means for perforating a hole through the casing into the stratum.

13. In apparatus for perforating a casing in a well in which a radioactive marker has been established in a known relation to a stratum, means for locating the marker by its radioactivity through the casing, and means connected to said marker locating means for perforating a hole through the casing into the stratum.

14. Apparatus for exploiting cased bore holes in which desired levels have been identified by marking means, comprising well perforating means adapted to be lowered to said desired levels, means connected to said well perforating means and movable therewith for detecting said marking means through the bore hole casing and means for obtaining indications of the response of said detecting means.

15. A method as in claim 5, in which the log prepared is one giving a nuclear energy property of the formations.

16. A method as in claim 5, in which the marker is one exhibiting nuclear energy properties.

17. A method as in claim 6, in which the log of the formations is one giving a radioactive property of the formations.

18. A method as in claim 7, in which the marker established is one exhibiting nuclear energy emitting properties.

19. An apparatus as in claim 8, in which the testing element is sensitive to nuclear energy.

20. An apparatus as in claim 9, in which the sensitive element is responsive to nuclear energy.

21. In a method of producing a fluid from the earth, the steps of: forming in the earth a bore hole in communication with said fluid; establishing a stratum as a marker below the surface of the earth and in a known relation to said fluid; setting a casing in said bore hole so as initially to wall off said fluid; locating said marker by detection of a physical property thereof; and then perforating said casing in a position correlated with said marker and determined in accordance with said known relation of said fluid and said marker, whereby said perforating will connect the interior of said casing with said fluid.

22. A method as in claim 21, in which the physical property detected is a nuclear energy property of the marker.

23. In means for perforating a casing in a well wherein a geophysical marker having a casing penetrating physical property has been established in a known relation to a production stratum, the combination of: a perforator; means for moving said perforator within said casing; marker locating means comprising a detector of said physical property having a recording means outside the well and a testing element connected to said perforator so as to move therewith; and means for actuating said perforator.

24. An apparatus as in claim 23, in which the detector is sensitive to a nuclear energy property of said marker.

25. In means for accurately positioning a member in a well in which a nuclear energy marker has been established, the combination of: a detector of nuclear energy for locating said marker, said detector comprising a sensitive element adapted to be lowered into the well to the position of said marker and means outside said well to indicate to an observer when said sensitive element is positioned adjacent said marker; and means for moving in said well said sensitive element and the member which is to be positioned.

26. In a method of perforating casing within a borehole, the steps of inserting a perforator within casing in said borehole, of adjusting the position of said perforator in accordance with radioactive rays received within the borehole, said step of adjusting being performed while receiving said rays, and of performng perforation at the adjusted position.

27. In a method of performing a casing perforating operation within a casing lined borehole in the earth, the steps of guiding perforating means and detecting means connected thereto to the proper location to perform said operation while utilizing said detecting means to detect within the borehole a physical phenomenon having its origin external to said casing but manifest within said casing, of adjusting the position of said means with respect to a location in the well where said detected phenomenon has a desired character and of performing the operation at the adjusted position.

SHELLEY KRASNOW.
LEON F. CURTISS.

REFERENCES CITED

The following references are of record in the file of this patent:

UNITED STATES PATENTS

| Number | Name | Date |
|---|---|---|
| Re. 20,120 | Schlumberger | Sept. 29, 1936 |
| 2,133,776 | Bender | Oct. 18, 1938 |
| 2,197,453 | Hassler | Apr. 16, 1940 |
| 2,220,205 | Buckley | Nov. 5, 1940 |
| 2,228,623 | Ennis | Jan. 14, 1941 |
| 2,320,643 | Neufeld | June 1, 1943 |
| 2,364,985 | Heigl et al. | Dec. 12, 1944 |
| 2,436,008 | Krasnow et al. | Feb. 17, 1948 |

OTHER REFERENCES

The Petroleum Engineer, December 1934, pp. 22-25, Field Development Operations Go Scientific, by Rubel.